United States Patent
Heuver

(10) Patent No.: US 9,062,755 B2
(45) Date of Patent: Jun. 23, 2015

(54) PLANETARY GEAR ASSEMBLY

(71) Applicant: Bradley Ronald Heuver, South Lyon, MI (US)

(72) Inventor: Bradley Ronald Heuver, South Lyon, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 71 days.

(21) Appl. No.: 13/888,250

(22) Filed: May 6, 2013

(65) Prior Publication Data

US 2014/0329636 A1 Nov. 6, 2014

(51) Int. Cl.
| | |
|---|---|
| *F16H 57/08* | (2006.01) |
| *F16H 57/00* | (2012.01) |
| *F16H 1/46* | (2006.01) |
| *F16H 57/04* | (2010.01) |

(52) U.S. Cl.
CPC ......... *F16H 57/082* (2013.01); *Y10T 29/49464* (2015.01); *F16H 2057/0056* (2013.01); *F16H 1/46* (2013.01); *F16H 57/0479* (2013.01)

(58) Field of Classification Search
None
See application file for complete search history.

(56) References Cited

U.S. PATENT DOCUMENTS

| | | | | |
|---|---|---|---|---|
| 2,924,997 | A * | 2/1960 | Rodler, Jr. | 475/258 |
| 2,977,165 | A * | 3/1961 | Olson | 92/251 |
| 4,998,909 | A * | 3/1991 | Fuehrer | 475/331 |
| 5,122,099 | A * | 6/1992 | Boedo et al. | 475/187 |
| 6,244,411 | B1 * | 6/2001 | Auer | 192/98 |
| 6,592,489 | B2 | 7/2003 | Tajima et al. | |
| 2001/0012808 | A1 | 8/2001 | Tajima et al. | |
| 2010/0151986 | A1 | 6/2010 | Burgman et al. | |
| 2012/0085192 | A1 * | 4/2012 | Ohno et al. | 74/434 |

FOREIGN PATENT DOCUMENTS

| | | |
|---|---|---|
| JP | 2009108891 A | 5/2009 |
| KR | 20090118520 A | 11/2009 |

* cited by examiner

*Primary Examiner* — Ramya Burgess
*Assistant Examiner* — David Morris
(74) *Attorney, Agent, or Firm* — James Dottavio; MacMillam, Sobanski & Todd, LLC

(57) ABSTRACT

A transmission planetary gear assembly, having: a carrier housing with axial orifice; a pinion shaft fitted through the axial orifice; a first fastener configured to axially secure the pinion shaft with respect to the carrier housing at one end of the shaft; and a second fastener configured to axially secure the pinion shaft with respect to the carrier housing at another end of the shaft.

13 Claims, 3 Drawing Sheets

PLANETARY GEAR ASSEMBLY

TECHNICAL FIELD

The present disclosure relates to transmission gear assemblies and methods of manufacturing the same.

BACKGROUND

Modern vehicle transmissions include a number of planetary gear assemblies. The gear assemblies typically include a sun gear, planet gears and a ring gear configured to rotate with respect to a carrier. A pinion shaft is included in the center of the gear assembly. Carriers can include a bore for the pinion shaft. The bore can extend through the carrier housing. The more common method used to retain a pinion shaft with respect to axial or rotational movement in a carrier housing is to stake or upset the shaft material itself. This can create design issues especially for transmissions with aluminum parts as aluminum tends to expand more than steel under high temperatures. Other retainers for the pinion shaft, e.g., roll pins have been used in the past to retain the pinion shaft, however, such retainers can obstruct the travel of the pinion shaft and shaft place-holding devices used in assembly before the shaft is positioned as designed.

Other types of fasteners have been used in the past, e.g., as shown in U.S. Pat. No. 6,592,489 titled "Transmission Equipped with Planetary Gear Mechanism and Planetary Gear Mechanism," which discloses the use of snap rings at various locations with respect to a carrier housing. Still, there is a need for a more high-volume-production-friendly process to hold the pinion shaft in position. Such retention means should be compatible with both the pre- and post-assembly requirements of the planetary gear assembly.

SUMMARY

The present disclosure addresses one or more of the above-mentioned issues. Other features and/or advantages will become apparent from the description which follows.

One advantage of the present disclosure is that it provides an axially rigid positioning system for pinion shafts with respect to the gear carrier. The disclosed fastening system also allows for the use of a "surrogate" shaft that holds needle bearings in the carrier bore in place prior to the installation of the pinion shaft.

One exemplary embodiment of the present disclosure relates to a transmission planetary gear assembly, including: a carrier housing with axial orifice; a pinion shaft fitted through the axial orifice; a first fastener configured to axially secure the pinion shaft with respect to the carrier housing at one end of the shaft; and a second fastener configured to axially secure the pinion shaft with respect to the carrier housing at another end of the shaft.

Another exemplary embodiment of the present disclosure relates to a transmission planetary gear assembly having: a carrier housing with through orifice; and a fastening system configured to secure a pinion shaft with respect to the carrier housing on each side of the through orifice.

Another exemplary embodiment of the present disclosure relates to a method of manufacturing a planetary gear assembly, the method including: forming a gear carrier; forming an orifice through the gear carrier; threading a pinion shaft through the gear carrier; positioning a first fastener to axially secure the pinion shaft with respect to the carrier housing at one end of the shaft; and positioning a second fastener to axially secure the pinion shaft with respect to the carrier housing at another end of the shaft.

The invention will be explained in greater detail below by way of example with reference to the figures, in which the same reference numbers are used in the figures for identical or essentially identical elements. The above features and advantages and other features and advantages of the present teachings are readily apparent from the following detailed description for carrying out the invention when taken in connection with the accompanying drawings. In the figures:

DETAILED DESCRIPTION

Figure 1:
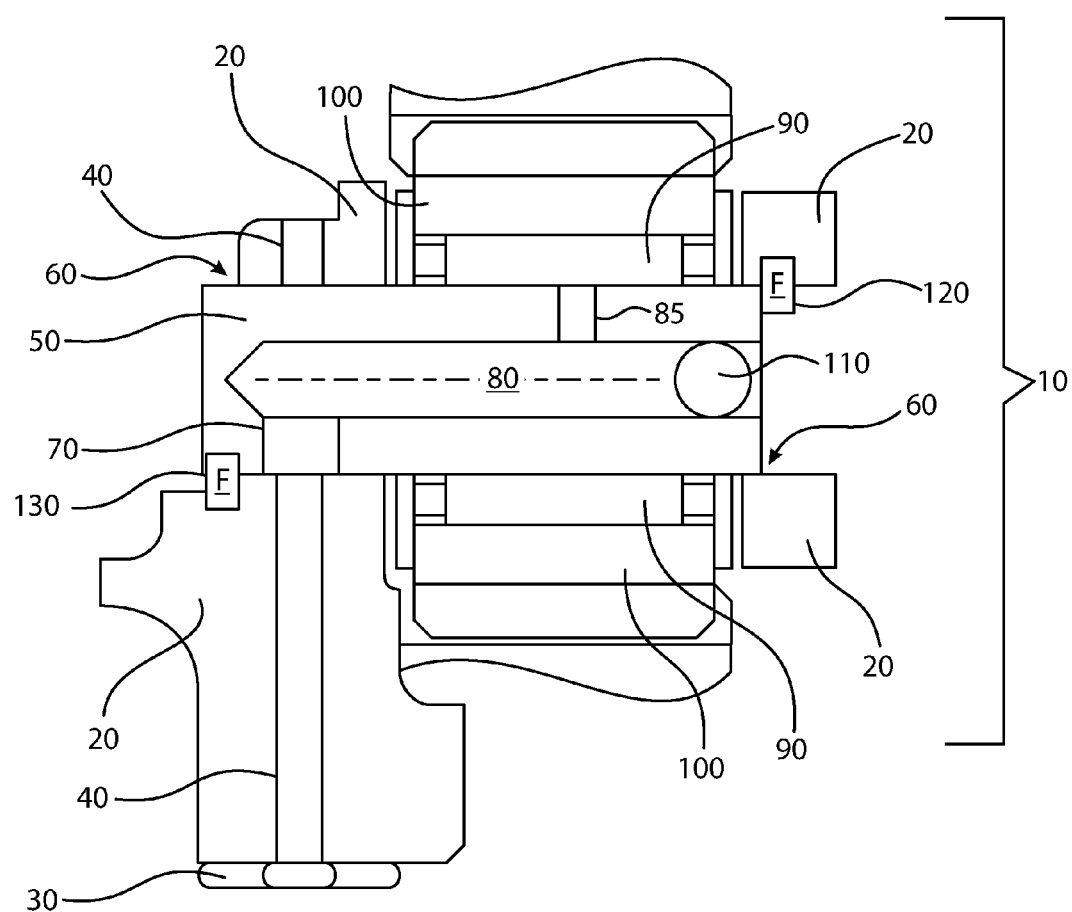
FIG. 1 is a side cross-sectional view of a planetary gear assembly according to an exemplary embodiment of the present disclosure.

Referring to the drawings, wherein like characters represent examples of the same or corresponding parts throughout the several views, there is shown an exemplary vehicle transmission planetary gear set or assembly. The planetary gear assembly includes a fastening system that restricts axial displacement of a pinion shaft in the assembly at each end of a through orifice in a carrier housing. The fastening system does not constrict the pinion shaft radially and thus pinion shaft surrogate devices can be used at either end of the shaft. Specifically, this design supports carriers with through holes utilizing a surrogate shaft during assembly. The surrogate shaft(s) are inserted into the gear assembly carrier housing. The surrogate shaft is spring-loaded such that it applies a radial force on the needle bearings until the pinion shaft is inserted therein.

The planetary gear assembly shown herewith is configured for use in an automatic transmission but can be configured for use in manual transmissions, dual-clutch transmissions, electrically variable transmissions or continuously variable transmissions.

Referring now to FIG. 1, there is shown therein a cross-sectional view of a portion of a planetary gear assembly 10 according to an exemplary embodiment of the present disclosure. The assembly 10 includes a carrier housing 20. Carrier housing 20 is shown at a top-quadrant of a transmission. Carrier housing 20 is configured to rotate with respect to an input shaft of the transmission (not shown). A bushing 30 is positioned between an inner diameter of the carrier housing and the input shaft. A lubrication orifice 40 is bored in the housing 20. Orifice 40 extends radially with respect to the housing 20.

A pinion shaft 50, as shown in FIG. 1, is positioned in a through hole or through orifice 60 included in the housing 20. Pinion shaft 50 also includes a radial orifice 70 for lubrication. Another orifice 80 extends along the axial length of pinion shaft; in communication therewith is orifice 85 in the shaft 50 that provides lubrication to a bearing 90 upon which a pinion gear 100 sits. Pinion shaft 50 is hollowed so as to facilitate lubrication at another end of the pinion shaft. A circular plug 110 is included at another end of shaft 50.

Figure 2:
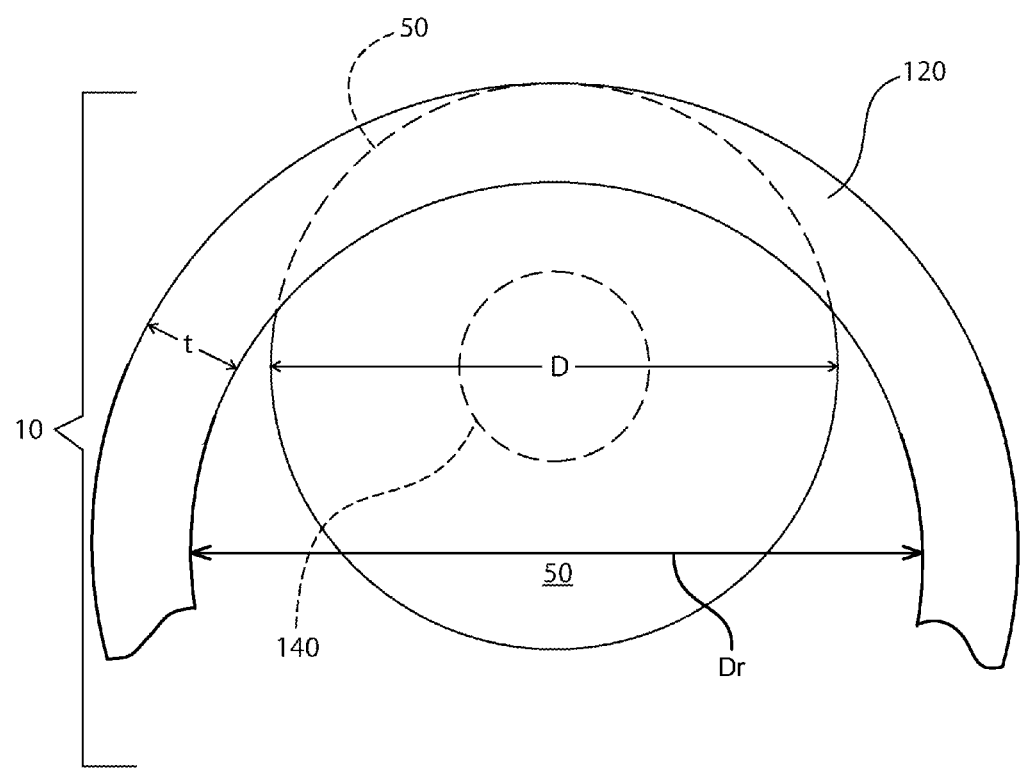
FIG. 2 is a partial side view of the planetary gear assembly of FIG. 1.

Pinion shaft 50 is constrained axially by a fastening system (labeled as "F") that includes two snap rings 120, 130 in the illustrated embodiment of FIG. 1. Fastener or ring 130 is a snap ring attached to an outer diameter of pinion shaft 50 on a more central radial position of the pinion shaft than fastener 120. Fastener 120 is also a snap ring. Fastener 120 is positioned at a more radially outward position with respect to the pinion shaft than fastener 130. To put it another way, the portion of the snap rinq 120 that is in surface contact with the pinion shaft 50 is at a more radially outer position of the planetary qear assembly 10 than the portion of the snap rinq 130 that is in surface contact with the pinion shaft 50. Each snap rinq 120, 130 only contacting a portion of the pinion shaft 50 can be better seen in the geometry of the components as shown in FIG. 2. Fastening system, F, prevents axial or rotational movement of the pinion shaft 50, when the fastening system is in place. Specifically, fastener 130 is designed to prevent rotation of the pinion shaft 50 about the centerline of the shaft. Fasteners 120, 130 are located so as to prevent them from becoming loose or dislodged when the carrier is subjected to high rotational speeds.

Now turning to FIG. 2 there is shown another partial side view of the planetary gear assembly 10 of FIG. 1. Shown is a side view of the pinion shaft 50 at one end. As shown, fastener 120, in this case, a snap ring, abuts the end of pinion shaft 50. Fastener 120 is configured to have a smaller thickness, t, than the diameter, D, of pinion shaft 50 so as to enable surrogate devices, e.g., 140 as shown in phantom, to travel on either end of pinion shaft 50 without obstruction regardless of whether the fastener 120 is in place with respect to the pinion shaft 50. Also, one will note that the inner diameter Dr of the snap ring 120 is substantially larger than the diameter D of the pinion shaft 50. This larger diameter Dr shown in FIG. 2 allows for the lack of constricting the pinion shaft 50 radially, discussed above, due to the contact of only a portion of each snap ring 120, 130 on only the radially outward or radially inward part, respectively, of the shaft 50 (as shown in FIG. 1).

Figure 3:
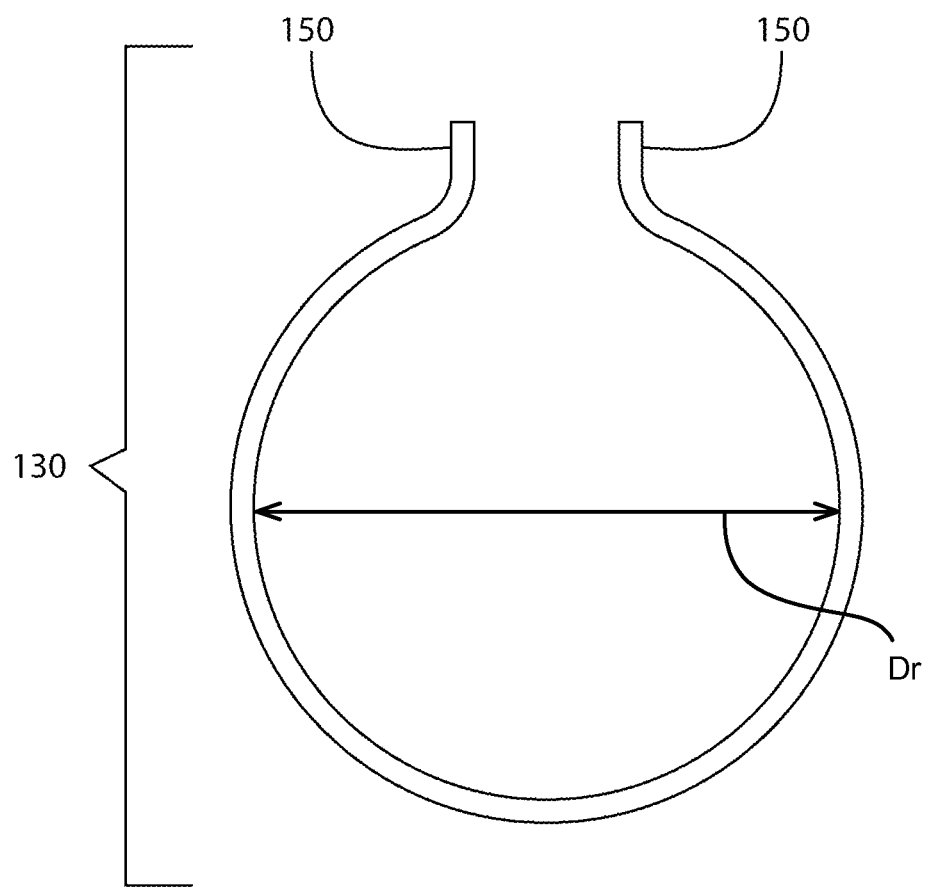
FIG. 3 is a front view of a fastener used in the planetary gear assembly of FIG. 1.

The snap rings 120, 130 used in the gear assembly 10 of FIG. 1 are of the kind illustrated in FIG. 3. FIG. 3 shows a front view of snap ring 130 having an inner diameter Dr. Snap ring 130 is annular and has a constant thickness along a radius of the snap ring in this embodiment. Fastener 130 includes an anchor flange 150 at each end configured to attach to a transmission component, e.g., carrier housing, without the use of a secondary fastener.

In the shown embodiment, fasteners are composed of steel and carrier housing is composed of aluminum composite. In other embodiments, components of the planetary gear assembly can be composed of other materials, e.g., a magnesium composite.

A method of manufacturing the illustrated planetary gear assembly will be apparent from the present disclosure as well. The method includes: (i) forming a gear carrier; (ii) forming an orifice through the gear carrier; (iii) threading a pinion shaft through the gear carrier; (iv) positioning a first fastener to axially secure the pinion shaft with respect to the carrier housing at one end of the shaft; and (v) positioning a second fastener to axially secure the pinion shaft with respect to the carrier housing at another end of the shaft. An example of the assembled gear assembly is shown in FIG. 1. Snap rings can be formed, for example using existing forming processes, e.g., stamping, milling, lathing or molding.

Positioning the first fastener or positioning the second fastener can include positioning the first or second fastener on an outer diameter of pinion shaft, e.g., as shown in FIG. 1. A snap ring flange is secured to the carrier and a portion of the annulus of the snap ring sits adjacent the pinion shaft to retain the shaft.

One embodiment of the method of manufacture includes attaching the first fastener to the gear carrier, thereby preventing rotation of the pinion shaft with respect to the carrier housing. One attachment method is shown, for example, in FIG. 1.

Another embodiment of the method includes forming either one of the first or second fasteners. Forming the fastener can include known forming techniques such as stamping, milling, or molding.

Those familiar with the art to which this invention relates will recognize various alternative designs and embodiments for practicing the invention within the scope of the appended claims.

I claim:

1. A transmission planetary gear assembly, comprising:
    a carrier with axial orifice;
    a pinion shaft fitted through the axial orifice;
    a first fastener having an inner diameter larger than an outer diameter of the shaft, axially securing the shaft with respect to the carrier at a first shaft end;
    a second fastener axially securing the shaft with respect to the carrier at a second shaft end and having anchor flanges fixed to the carrier; and
    wherein the second fastener only contacts the shaft at a more radially outer position relative to the planetary gear assembly than where the first fastener contacts the shaft.

2. The gear assembly of claim 1, wherein the second fastener has an inner diameter larger than the outer diameter of the shaft.

3. The gear assembly of claim 1, wherein the first or second fastener is configured to secure the shaft to the carrier such that rotation of the pinion shaft with respect to the carrier is prevented.

4. The gear assembly of claim 3, wherein a thickness of the first or second fastener is smaller than the diameter of the pinion shaft thereby enabling access to a center of the pinion shaft.

5. The gear assembly of claim 1, wherein the second fastener is configured to secure the shaft to the carrier such that rotation of the shaft with respect to the carrier is prevented.

6. The gear assembly of claim 1, wherein the first and second fasteners are composed of steel.

7. The gear assembly of claim 1, wherein a thickness of the first or second fastener is smaller than the diameter of the pinion shaft thereby enabling access to a center of the pinion shaft.

8. A transmission planetary gear assembly having:
    a carrier with through orifice;
    a pinion shaft mounted in the orifice;
    a first snap ring having an inner diameter larger than an outer diameter of the shaft and a second snap ring having an inner diameter larger than the outer diameter of the shaft, the snap rings securing the shaft with respect to the carrier on each side of the orifice; and
    wherein the second snap ring only contacts the shaft at a more radially outer position relative to the planetary gear assembly than where the first fastener contacts the shaft.

9. The gear assembly of claim 8, wherein the first snap ring includes a pair of anchor flanges fixed to the carrier; and
    the second snap ring includes a pair of anchor flanges fixed to the carrier.

10. The gear assembly of claim 9, wherein the first or second snap ring is configured to secure the shaft to the carrier such that rotation of the shaft with respect to the carrier is prevented.

11. The gear assembly of claim 10, wherein the second snap ring is configured to secure to the outer diameter of the pinion shaft.

12. The gear assembly of claim 8, wherein the first and second snap rings are composed of steel.

13. A transmission planetary gear assembly, comprising:
a carrier with axial orifice;
a pinion shaft fitted through the axial orifice;
a first fastener having an inner diameter larger than an outer diameter of the shaft, axially securing the shaft with respect to the carrier at a first shaft end;
a second fastener axially securing the shaft with respect to the carrier at a second shaft end and having anchor flanges fixed to the carrier; and
wherein the first or second fastener is configured to secure the shaft to the carrier such that rotation of the pinion shaft with respect to the carrier is prevented, and wherein the second fastener only contacts the shaft at a more radially outer position relative to the planetary gear assembly than where the first fastener contacts the shaft.

\* \* \* \* \*